Aug. 25, 1959  M. J. G. TIPPER  2,901,068
CYCLE CONTROL FOR CASING CLOSURE
Filed Dec. 27, 1956  4 Sheets-Sheet 1

Inventor:
Maynard J. G. Tipper
By Peter J. Taylor
Attorney

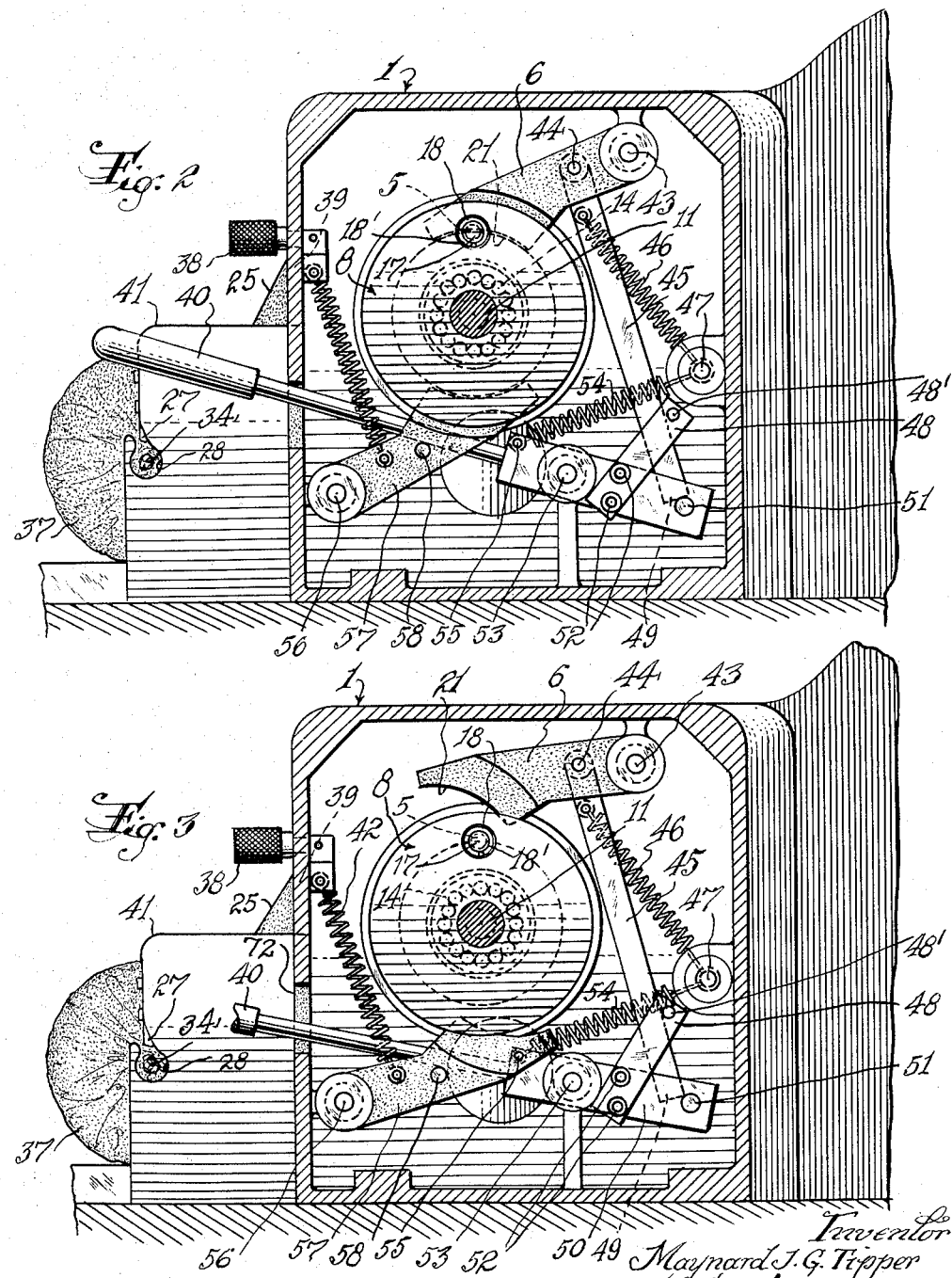

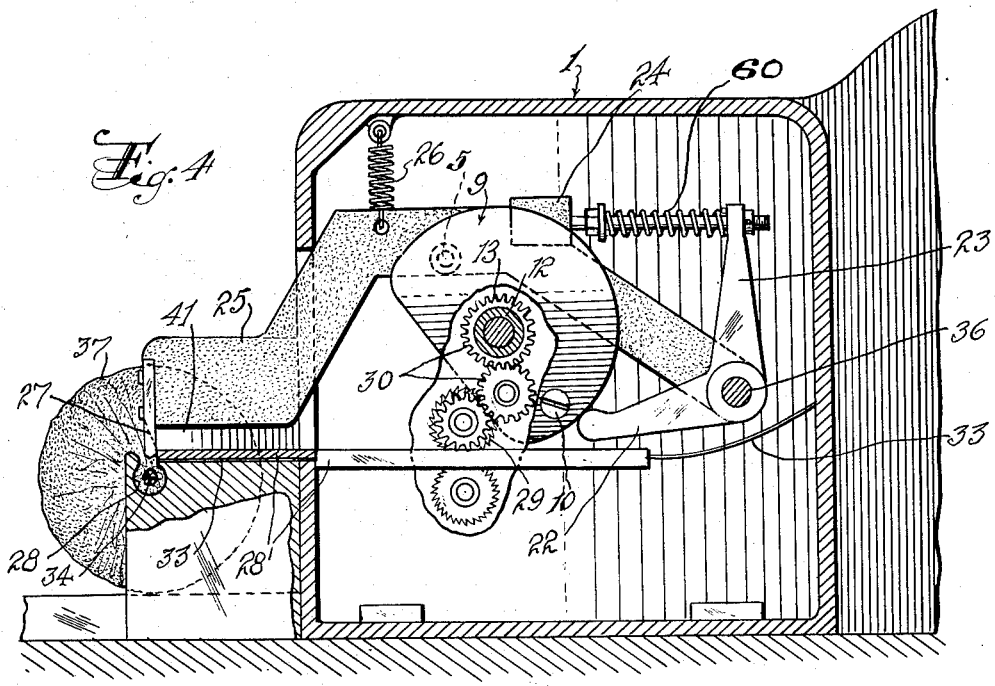
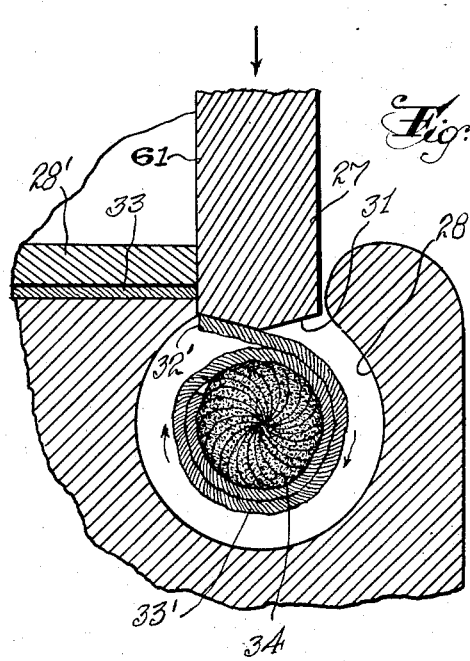
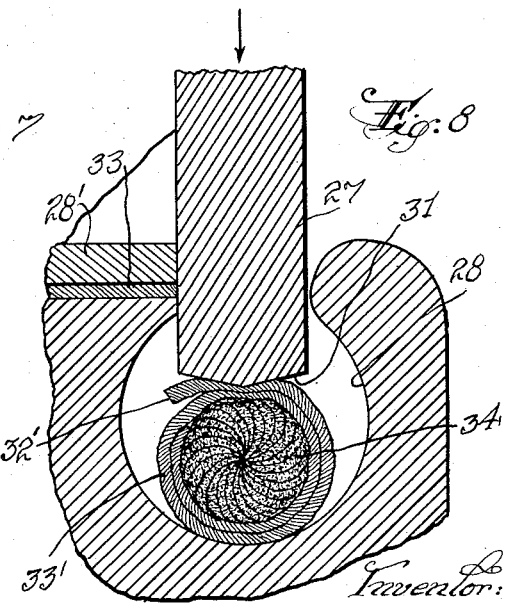

Aug. 25, 1959 M. J. G. TIPPER 2,901,068
CYCLE CONTROL FOR CASING CLOSURE
Filed Dec. 27, 1956 4 Sheets-Sheet 4
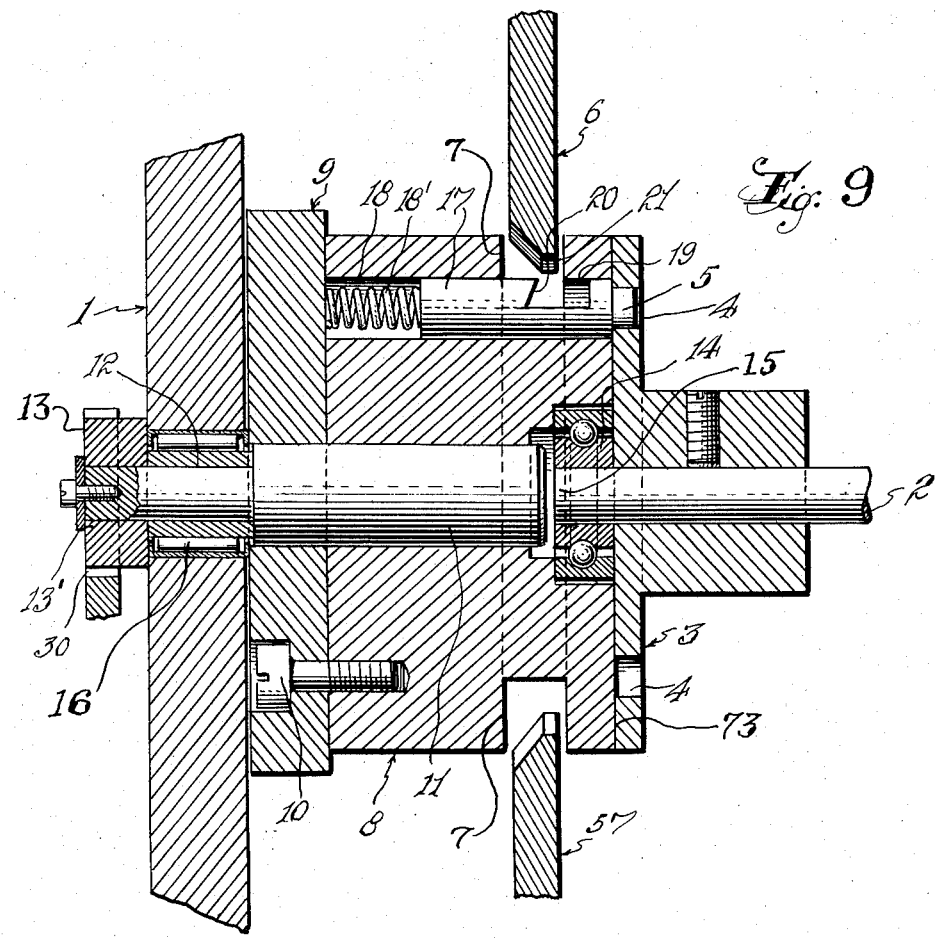
Inventor:
Maynard J. G. Tipper
By Peter J. Taylor
Attorney.

United States Patent Office 2,901,068
Patented Aug. 25, 1959

2,901,068

CYCLE CONTROL FOR CASING CLOSURE

Maynard J. G. Tipper, Castro Valley, Calif.

Application December 27, 1956, Serial No. 630,910

2 Claims. (Cl. 192—25)

This invention relates to a cycle or fractional-cycle interruption in the closing of casings by means of ribbon type fasteners.

In U.S. Patent 2,729,263 issued to M. J. G. Tipper, there is described a machine for the fastening of sausage and other casings by means of a deformable ribbon, such as one of metal. In this machine, the twisted casing end is inserted in a die cavity and a vertically acting die is used to deflect the ribbon into said cavity to circumscribe the casing end, cut off the circumscribing ribbon and crimp it onto the casing end. Although the present invention is applicable to various types of casing closing machines, its application to such machines will be exemplified and specifically directed herein to the machine disclosed in the aforesaid patent.

In such machines, it is often desired to interrupt operation to enable the operator to effect certain adjustments to the casing or casing end. For example, in the machine of the patent mentioned, it is desirable to stop the operation after the ribbon is circumscribed around the twisted casing end just before it is cut off, for the purpose of pulling out the casing end and fastening the ribbon as close as possible to the casing contents. Thereafter, the ribbon is cut off and crimped into the casing end.

Figure 1:
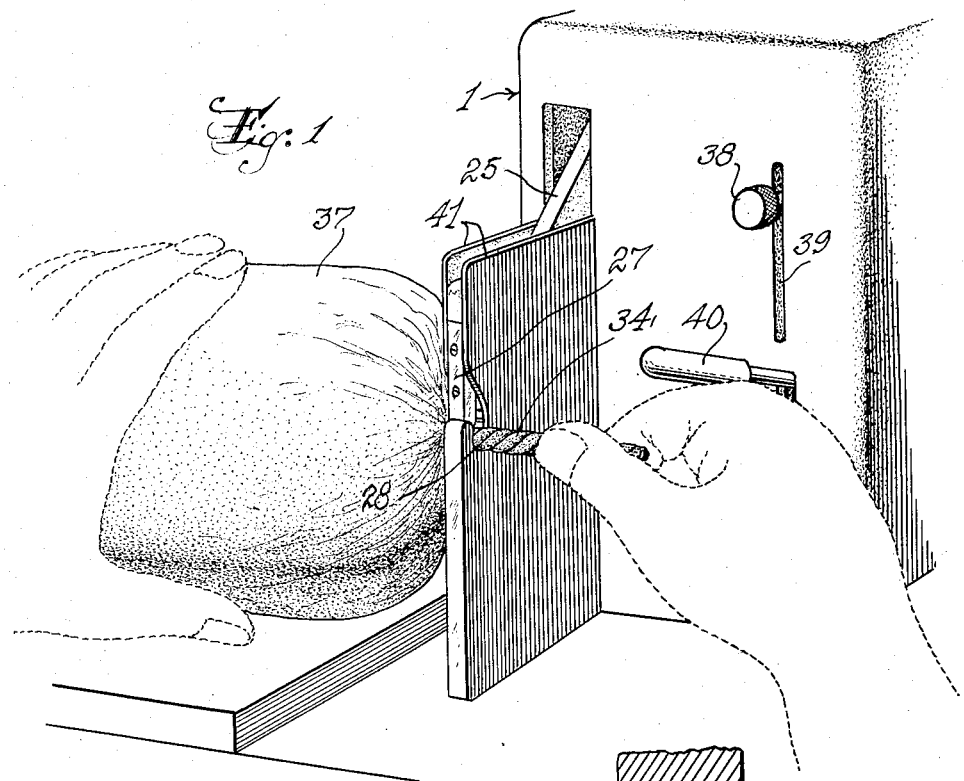

The invention will be more readily understood by reference to the accompanying drawings in which a preferred embodiment is presented. Figure 1 of these drawings illustrates a perspective outside front view of the machine and its mode of applying ribbon fastener to a casing end. Figure 2 depicts a cross-sectional side view of the machine with the cam removed from the shaft and the throwout arms depicted in clutch-disengaging position. Figure 3 is a similar view with the throwout arms in clutch-engaging position. Another cross-sectional side view of the same machine is depicted in Figure 4 to show the cam action, wherein the cam, clutch body, driving flange and housing are partly cut away to expose the gear train which feeds the ribbon to the die cavity. Figures 5, 6, 7 and 8 are cross-sectional side views of the die and die-cavity portions of the machine at different stages of operation. Figure 9 is a cross-sectional side view of the cam and clutch assembly with clutch engaged with the driving flange, while Figure 10 depicts a similar fragmentary view showing how the upper throwout arm disengages the clutch pin from the driving flange. Similar numerals refer to similar parts in the various figures.

Referring again to the drawings, numeral 1 represents a housing supporting the bearing for motor drive shafts 2 and 12 (Fig. 9). Affixed to motor-driven shaft 2 is driving flange 3 having holes 4 disposed in line with clutch pin 5 and engageable thereby when said clutch pin is released by withdrawal of throwout arm 6 or 57 from groove 7 in clutch body 8. Clutch body 8 is attached to cam 9 by means of bolt 10, so that both ride on floating shaft 11 which is a continuation of shaft 12 that rotates in bearing 16 and is held in place by locking means 13'. A pilot bearing 14 is provided in clutch body 8 for projecting end 15 of shaft 2.

The end of shaft 12 is connected with a gear train 13, 30 and 29 (Fig. 4) by means of which metal ribbon 33 is intermittently fed through guide 28' into die cavity 28, as will be outlined. Cam 9 operates cam lever 22 mounted on shaft 36. Lever 22 is joined to arm 23 which intermittently depresses die arm 25, also riding on shaft 36. Spring 26 enables return to idle position of die 27 attached to arm 25.

Lower throwout arm 57 (Figs. 2 and 3) pivoted on shaft 56 (which connected to housing 1) is designed to be depressed by lever 40 pivoted at 53. This action also causes raising of upper throwout arm 6 pivoted at 43, due to lifting of link 45 which rests on pin 51 (on the other end of lever 40) and which is pivoted on arm 6 at 44. Kicker arm 48 is fixed to arm 40 at points 52 and is provided with protruding pin 48' at its upper end. As lever 40 is depressed to its lowest point in slot 72, pin 48' causes link 45 to be pushed off pin 51 (Fig. 3), resulting in an overthrow action which allows upper throwout arm 6 to drop (Fig. 10) into clutch groove 7 (by action of spring 46), while lower throwout arm 57 stays depressed as long as lever 40 is held down. When lever 40 is released, however, spring 54 (attached to engagement or pivot 47 on base 1, and at point or pivot 55 on arm 40) causes lever 40 to come up, which then allows lower throwout arm 57 to return into clutch groove 7. Also, link 45 again returns to the position where it rides on pin 51. By means of the aforesaid mechanism, the action on cam 9 may be made full-cycle (revolution) or half-cycle, as will be outlined. Lower throwout arm 57 may be set permanently into dropped-out position by lowering set screw 38 in slot 39 which relieves tension from spring 42.

When either the upper or lower throwout arm 6 or 57, respectively, is positioned to ride in clutch groove 7 (Figs. 9 and 10) they ride along in the groove until they meet pin shaft 17 which is adapted to slide in cylinder 18 of the clutch body. Tapered end 21 of either arm then engages pin shaft 17 in notch 20, causing the pin shaft to be moved against the action of spring 18' and towards cam 9. This action causes clutch pin 5 to be withdrawn from engaged hole 4 in driving flange 3, thereby disengaging the clutch and cam assembly from rotating driving flange 3, bringing the aforesaid assembly to a stop. And, in a reverse manner, when the dropout arm in such engagement is removed from groove 7, clutch pin 5 is released and it then will engage hole 4 in flange 3, which will cause rotation of the clutch and cam assembly as well as the gear train 30, etc., connected to floating shafts 11 and 12. There is a clearance of about 0.01" between the face of the clutch body 8 and driving flange 3 whereupon clutch assembly then becomes stationary.

This cycle control is readily applicable to a casing fastening machine such as the one described in U.S. Patent 2,729,263, there being obvious changes made which would be required to adapt the control thereto, as would be apparent to one skilled in the art. The machine applies a metal ribbon 33 (Figs. 1 and 5–8) around the twisted end 34 of a stuffed casing 37. Die arm 25 and die 27 are protected from contacting the fingers by guards 41 (Fig. 1). When the twisted casing end 34 is inserted in die cavity 28, and trip lever 40 is depressed as in Figure 3, and then released immediately, upper throwout arm 6 is raised by the action of link 45 (as heretofore described) and clutch pin 5 is released to engage a hole 4 in driving flange 3 (which has been rotating on shaft 2 connected to a motor (not shown)). This causes cam 9 to rotate and cam lever arm 23 presses against stiff spring 60, pushing against the thrust end 24 of die arm 25, causing die 27 to move downwardly resiliently. At the same time, gear train 30, etc., is causing metal ribbon 33 to be fed through guide 28' into die cavity 28, as in Figures 5 and 6.

Figures 5, 6:
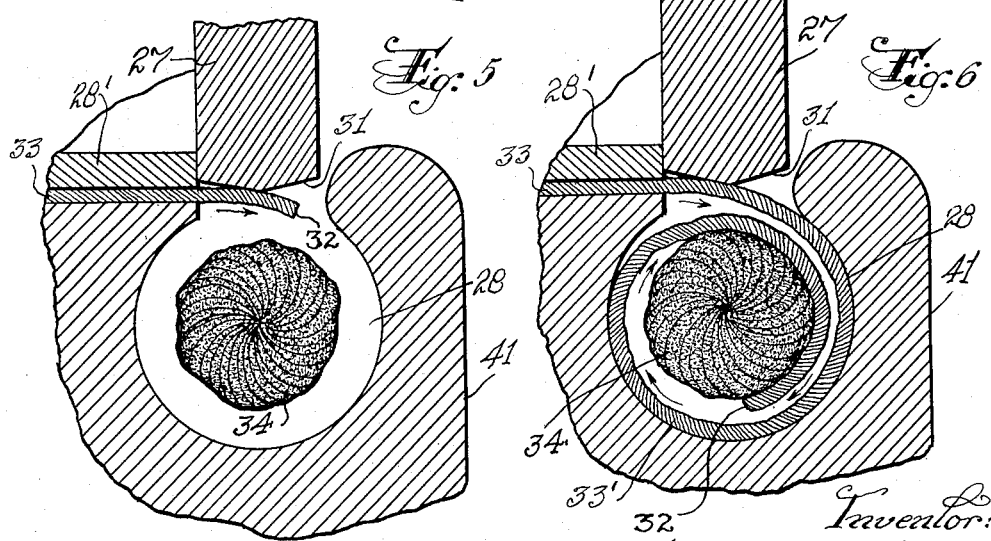

When the end 32 of ribbon 33 touches tapered end 31 of die 27, the ribbon is deflected downwardly so that it continues to travel into die cavity 28 and to loosely circumscribe end 34 of the casing as in Figure 6. By this time, clutch pin shaft 17 has completed a fraction of a revolution and is then contacted by lower throwout arm 57 which pulls out pin 5 from the engaging hole in driving flange 3, causing floating shafts 11 and 12 to stop. This interruption in the cycle gives the operator time to pull surplus casing through circumscribing ribbon 33' and to get it close to the stuffed casing 37.

When this is accomplished, the operator again depresses lever 40 and releases it immediately, whereupon lower throwout arm 57 is made to release clutch pin 5 to engage a hole 4 in driving flange 3 and floating shafts 11 and 12 again are rotated. Cam 9 causes die 27 to be pressed further as in Figure 7. Since face 61 of die 27 is sharp and is disposed in slicing arrangement with the edge of die cavity 28, it acts as a punch and cuts off ribbon 33 at 32' while the feeding of ribbon 33 is discontinued. Thereafter, die 27 continues on its downward stroke (through action of cam 9) and die end 31 presses down on the fastened casing to crimp the ribbon to casing end 34 as in Figure 8, whereby the casing becomes fastened. Thereafter, die 27 is raised (by spring 26) and, when it reaches the position as in Figure 5, clutch pin shaft 17 has contacted upper throwout arm 6 riding in groove 7 and this causes clutch pin 5 to be withdrawn out of engagement with driving flange 3, which action stops rotation of shafts 11 and 12. The cycle then may be repeated.

When the machine stops at the end of a cycle (revolution), cam 9 has allowed spring 26 to pull punch 27 upwardly so that punch tip 31 is about ¾" above the throat of die cavity 28. This enables a twisted casing end 34 to be pushed down through the throat into die cavity 28. As the cycle begins, punch tip 31 moves down to the position shown in Figure 5 and remains there during the feeding of the tape.

If it is desired that a complete uninterrupted revolution of shafts 11 and 12 be effected, trip lever 40 is depressed all the way and held in that position until kicker arm 48 effects the overthrow action of link 45, as heretofore outlined. If one-revolution operation is to be run continuously, such operation would be facilitated by dropping lower throwout arm 57 by lowering set screw 38 in slot 39, thereby eliminating the fractional-revolution interruption. It is apparent that either arm 6 or 57 may be located at any point of groove 7, as desired. Also, any number of throwout arms may be used depending upon the number of interruptions desired of shafts 11 and 12 during a revolution.

I claim:

1. In a clutch for driving a feed means in timed relation with another movable unit of a machine operated by a driven shaft mounted in a side of a housing and having a flange concentrically attached to and near the end of said driven shaft, a series of openings disposed in said flange arranged concentrically around said shaft serving as clutch pin engaging means, a floating shaft mounted in the other side of said housing coaxially and adjacent to said driven shaft, a cylindrical clutch body disposed concentrically around the end of said floating shaft and having one face disposed adjacent said flange, a circumferential groove cut into the peripheral surface of said clutch body, a retractable clutch pin slidably disposed within said clutch body at right angles to said groove and having a portion thereof exposed within the lower part of said groove and designed to protrude beyond said clutch face and engage one of said openings in said flange when said clutch pin is extended, a retracting notch disposed in the portion of said pin exposed in said groove, a cam fixed to the opposite end face of said clutch body in line with said shaft, an upper and a lower spring-held beveled clutch pin retracting arm, each having one end swively attached to said housing and its other end arranged to ride yieldingly in said groove when so permitted and, by means of its bevel to retract said clutch pin during rotation of said clutch body, thereby temporarily disengaging said clutch body from said flange, operating means coacting with said cam and arranged so as to operate said other movable unit as said cam is rotated, a vertically movable lever pivoted near its center and having an operated end and a link-engaging end, a link swively connected at one end to said upper retracting arm and at the other end to the engaging end of said lever in a manner so that said upper arm is released out of said groove when said operated end of said lever is depressed, and engaging means on said lower arm disposed to engage the operated end portion of said lever when said lever is depressed, whereby said lower arm is released out of said groove, the improvement comprising a first-mentioned thrust element disposed on the link-engaging end of said lever for exerting thrust on the bottom of said link riding thereon, a kicker arm having one end fixed to said lever between its pivot and said thrust element, a second-mentioned thrust element disposed on the other end of said kicker arm for exerting a thrust on the side of said link, in a manner such that said link is pushed off said first-mentioned thrust element toward said lever pivot when said lever is completely depressed, spring means attached to said link and also serving as the spring holding means tending to hold said upper arm in said groove and to move said link onto said first-mentioned thrust element when said operated end of said lever is raised, and spring means attached to said lever in a manner so as to raise said lever when pressure is not exerted thereon.

2. A clutch according to claim 1 in which the lower clutch pin retracting arm has one end of the holding spring attached thereto, and a vertically-adjustable lock screw attached to the other end of said latter spring, said lock screw having an adjustment range sufficient to remove permanently said lower arm from said groove by reduction of tension of said latter spring.

References Cited in the file of this patent
UNITED STATES PATENTS

| | | |
|---|---|---|
| 1,425,994 | McCullough | Aug. 15, 1922 |
| 1,701,934 | Ross | Feb. 12, 1929 |
| 2,729,263 | Tipper | Jan. 3, 1956 |